(12) United States Patent
Rosen et al.

(10) Patent No.: US 11,605,027 B2
(45) Date of Patent: Mar. 14, 2023

(54) MACHINE LEARNING SYSTEM, METHOD, AND COMPUTER PROGRAM FOR INFERRING USER PRESENCE IN A RESIDENTIAL SPACE

(71) Applicant: Amdocs Development Limited, Limassol (CY)

(72) Inventors: Gil Rosen, Tel Mond (IL); Vivi Miranda, Raanana (IL); Gilli Shama, Ra'anana (IL); Amir Lapid, Givatayim (IL); Eytan Kabilou, Kadima (IL); Ilan Levy, Herzeliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 308 days.

(21) Appl. No.: 16/925,187

(22) Filed: Jul. 9, 2020

(65) Prior Publication Data

US 2022/0012630 A1 Jan. 13, 2022

(51) Int. Cl.
*G06N 20/00* (2019.01)
*H04L 67/50* (2022.01)
*H04L 67/54* (2022.01)
*G06Q 50/16* (2012.01)
*G05B 19/042* (2006.01)
*G06N 5/04* (2023.01)
*H04L 43/04* (2022.01)
*H04L 43/0876* (2022.01)

(52) U.S. Cl.
CPC .......... *G06N 20/00* (2019.01); *G05B 19/042* (2013.01); *G06N 5/04* (2013.01); *H04L 43/04* (2013.01); *H04L 43/0876* (2013.01); *G05B 2219/2642* (2013.01); *G06Q 50/163* (2013.01)

(58) Field of Classification Search
CPC .......... G06N 20/00; G06N 5/04; H04L 43/04; H04L 43/0876
See application file for complete search history.

(56) References Cited

U.S. PATENT DOCUMENTS

| 7,050,555 B2 | 5/2006 | Zargham et al. |
| 7,698,163 B2 | 4/2010 | Reed et al. |
| 9,584,335 B1 | 2/2017 | Malasani |
| 9,819,610 B1 | 11/2017 | Crump et al. |

(Continued)

FOREIGN PATENT DOCUMENTS

| CN | 101902378 A | 12/2010 |
| CN | 101299694 B | 4/2012 |

(Continued)

OTHER PUBLICATIONS

Advisory Action from U.S. Appl. No. 16/925,211, dated Sep. 17, 2021.

(Continued)

*Primary Examiner* — Shirley X Zhang
(74) *Attorney, Agent, or Firm* — Zilka-Kotab, P.C.

(57) ABSTRACT

As described herein, a machine learning system, method, and computer program are provided for inferring user presence in a residential space. In use, network usage data is collected from a residential network router operating in a residential space. Additionally, the network usage data is processed by a machine learning algorithm to infer whether a user is present in the residential space. Further, the inference is output for performing one or more related actions.

17 Claims, 6 Drawing Sheets

(56) References Cited

U.S. PATENT DOCUMENTS

| | | | |
|---|---|---|---|
| 10,448,204 | B2 | 10/2019 | Maloney et al. |
| 10,536,345 | B2 | 1/2020 | Jacobson et al. |
| 2007/0147247 | A1 | 6/2007 | Kalonji et al. |
| 2008/0082386 | A1 | 4/2008 | Cunningham et al. |
| 2010/0262467 | A1 | 10/2010 | Barnhill, Jr. et al. |
| 2014/0327555 | A1 | 11/2014 | Sager et al. |
| 2015/0347536 | A1 | 12/2015 | Smith |
| 2016/0344873 | A1 | 11/2016 | Jenzeh et al. |
| 2017/0264501 | A1 | 9/2017 | Mathen et al. |
| 2018/0040011 | A1 | 2/2018 | Milton |
| 2018/0102032 | A1 | 4/2018 | Emmanuel et al. |
| 2018/0165431 | A1 | 6/2018 | Neumann et al. |
| 2018/0165936 | A1 | 6/2018 | Smith et al. |
| 2018/0183684 | A1 | 6/2018 | Jacobson et al. |
| 2018/0212837 | A1 | 7/2018 | Kallur et al. |
| 2018/0288567 | A1 | 10/2018 | Maloney et al. |
| 2018/0316571 | A1 | 11/2018 | Andrade et al. |
| 2019/0014381 | A1 | 1/2019 | Tidwell et al. |
| 2019/0035244 | A1* | 1/2019 | Garg ................. G08B 13/2491 |
| 2019/0095478 | A1 | 3/2019 | Tankersley et al. |
| 2019/0097909 | A1 | 3/2019 | Puri et al. |
| 2019/0190848 | A1 | 6/2019 | Zavesky et al. |
| 2019/0363943 | A1 | 11/2019 | De Angelis et al. |
| 2020/0019365 | A1 | 1/2020 | Spooner |
| 2020/0104874 | A1 | 4/2020 | Chintakindi et al. |
| 2020/0210393 | A1 | 7/2020 | Beaver et al. |
| 2021/0199326 | A1* | 7/2021 | Venkatesh ................ F24F 11/65 |
| 2021/0199328 | A1* | 7/2021 | Venkatesh ................ F24F 11/46 |
| 2021/0345140 | A1* | 11/2021 | Meingast .............. H04W 24/08 |
| 2022/0012631 | A1 | 1/2022 | Rosen et al. |

FOREIGN PATENT DOCUMENTS

| | | | |
|---|---|---|---|
| CN | 104504598 | A | 4/2015 |
| CN | 103458059 | B | 4/2018 |
| CN | 105657073 | B | 7/2019 |
| EP | 3457635 | A1 | 3/2019 |
| WO | 2016077613 | A1 | 5/2016 |
| WO | 2017087285 | A1 | 5/2017 |

OTHER PUBLICATIONS

International Search Report and Written Opinion from PCT Application No. PCT/IB2021/056149, dated Sep. 23, 2021.
Non-Final Office Action from U.S. Appl. No. 16/925,199, dated Jan. 19, 2022.
Rosen et al., U.S. Appl. No. 16/925,199, filed Jul. 9, 2020.
Rosen et al., U.S. Appl. No. 16/925,203, filed Jul. 9, 2020.
Rosen et al., U.S. Appl. No. 16/925,211, filed Jul. 9, 2020.
Martin et al., "User-Driven Dynamic Traffic Prioritization for Home Networks," W-MUST'12, Aug. 2012, pp. 19-23.
Bozkurt et al., "Contextual Router: Advancing Experience Oriented Networking to the Home," SOSR'16, Mar. 2016, 7 pages.
Gharakheili et al., "Personalizing the Home Network Experience using Cloud-Based SDN," ResearchGate, Jan. 2014, 7 pages, retrieved from https://www.researchgate.net/publication/312978882_Personalizing_the_home_network_experience_using_cloud-based_SDN.
Fung, B., "How stores use your phone's WiFi to track your shopping habits," The Washington Post, Oct. 19, 2013, 7 pages, retrieved from https://www.washingtonpost.com/news/the-switch/wp/2013/10/19/how-stores-use-your-phones-wifi-to-track-your-shopping-habits/.
Final Office Action from U.S. Appl. No. 16/925,211, dated Feb. 11, 2022.
International Search Report and Written Opinion from PCT Application No. PCT/IB2021/056148, dated Oct. 12, 2021.
Non-Final Office Action from U.S. Appl. No. 16/925,211, dated Oct. 15, 2021.
Final Office Action from U.S. Appl. No. 16/925,211, dated Jul. 8, 2021.
Advisory Action from U.S. Appl. No. 16/925,211, dated May 17, 2022.
Final Office Action from U.S. Appl. No. 16/925,199, dated Jun. 15, 2022.
Sunny et al., "Residential Energy Management: A Machine Learning Perspective," IEEE Green Technologies Conference, Apr. 2020, pp. 229-234.
Notice of Allowance from U.S. Appl. No. 16/925,211, dated Jun. 16, 2022.
Corrected Notice of Allowance from U.S. Appl. No. 16/925,211, dated Jul. 1, 2022.
Non-Final Office Action from U.S. Appl. No. 16/925,203, dated Aug. 12, 2022.
Advisory Action from U.S. Appl. No. 16/925,199, dated Aug. 31, 2022.
Notice of Allowance from U.S. Appl. No. 16/925,211, dated Sep. 29, 2022.
Bakhshi et al., "User-Centric Traffic Optimization in Residential Software Defined Networks," IEEE 23rd International Conference on Telecommunications (ICT), 2016, 6 pages.
Non-Final Office Action from U.S. Appl. No. 16/925,211, dated Mar. 30, 2021.
Zhou, X., "Understanding Home Networks with Lightweight Privacy-Preserving Passive Measurement," UKnowledge, Theses and Dissertations, Computer Science, 2016, 135 pages.

* cited by examiner

MACHINE LEARNING SYSTEM, METHOD, AND COMPUTER PROGRAM FOR INFERRING USER PRESENCE IN A RESIDENTIAL SPACE

FIELD OF THE INVENTION

The present invention relates to systems and processes for deriving user presence in a defined area.

BACKGROUND

To date, various systems and processes have been developed to identify user presence in a defined area. This information can be useful for many purposes. For example, users in close proximity to a particular business can be presented with an advertisement, offer, or other information associated with that particular business.

To date, these systems and processes have been utilized with respect to large scale areas, and have relied on global positioning system (GPS) data to determine user location or network connectivity of a user device in a public space to determine user location. Thus, these systems and processes are not adapted to determine user presence in a residential space.

There is thus a need for addressing these and/or other issues associated with the prior art.

SUMMARY

As described herein, a machine learning system, method, and computer program are provided for inferring user presence in a residential space. In use, network usage data is collected from a residential network router operating in a residential space. Additionally, the network usage data is processed by a machine learning algorithm to infer whether a user is present in the residential space. Further, the inference is output for performing one or more related actions.

DETAILED DESCRIPTION

Figure 1:
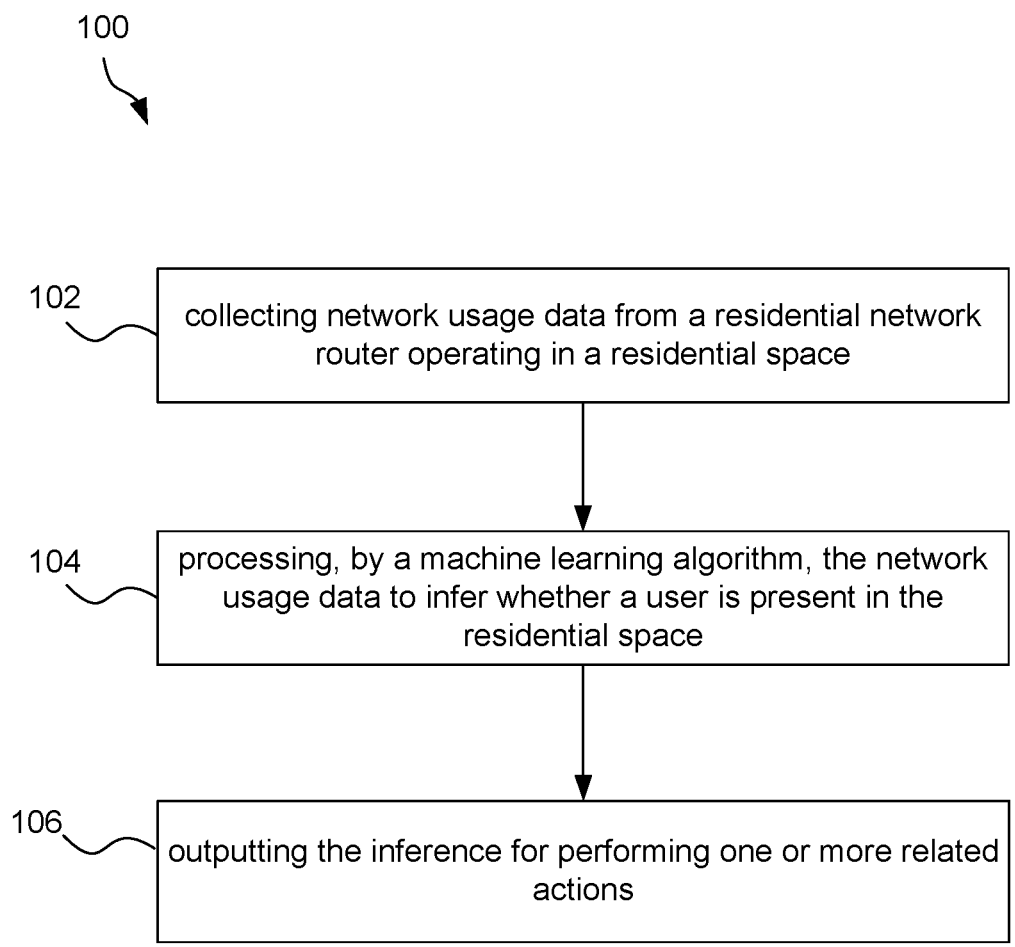
FIG. 1 illustrates a machine learning method for inferring user presence in a residential space, in accordance with one embodiment.

FIG. 1 illustrates a machine learning method 100 for inferring user presence in a residential space, in accordance with one embodiment. In one embodiment, the method 100 may be performed by a computer system (e.g. server) or group of computer systems, such as those described below with reference to FIGS. 5 and/or 6. For example, the method 100 may be performed by a cloud processing system in communication with the residential network router via a network. As another example, the method 100 may be performed by the residential network router itself.

As shown in operation 102, network usage data is collected from a residential network router operating in a residential space. The residential space may be a house, apartment unit, work office, or other residential unit or structure used principally for residential purposes by a substantially unchanging group of people. The residential network router is any network router that enables communication between a network (e.g. the Internet) and user devices within and possibly around the residential space. Thus, the residential network router may be located within the residential space, in one embodiment. The user devices may communicate with the residential network router via a second network, such as a local area network (LAN).

As noted above, network usage data is collected from the residential network router. The network usage data may be data indicating instances of usage of the network by residents of the residential space, through use of the residential network router, in one embodiment. For each of the instances of usage, the network usage data may include a time of the instance of usage, a duration of the instance of usage, an amount of the instance of usage, a user device associated with (i.e. source of) the instance of usage, a user account associated with the instance of usage, or any other data describing the usage of the network.

In one embodiment, the residential network router may be configured to communicate the network usage data in real time for the real-time collection thereof. In another embodiment, the network usage data may be collected by analyzing communications sent by the residential network router in its normal course of use by the user devices. Of course, it should be noted that the network usage data, which originates from the residential network router, may be collected in any desired manner. Further, the network usage data may be stored for processing, as described below.

Additionally, as shown in operation 104, the network usage data is processed by a machine learning algorithm to infer whether a user is present in the residential space. The machine learning algorithm may be a deep learning algorithm, neural network, etc. In any case, the machine learning algorithm is trained to infer from the network usage data whether the user (e.g. a resident of the residential space) is present in the residential space.

By way of example, one or more user devices connected to the residential network router may be classified as stationary or non-stationary, based on the network usage data. With respect to this example, the machine learning algorithm may use this classification to infer whether the user is present in the residential space (e.g. the user may be inferred as being present in the residential space when, among possible other criteria, a device of the one or more user devices that is mapped to the user is classified as non-stationary, and/or may be inferred as not being present in the residential space when, among possible other criteria, a device of the one or more user devices that is mapped to the user is classified as stationary). As a further option, the machine learning algorithm may also perform network event processing to infer transitions in presence of the user within the residential space.

Further, as shown in operation 106, the inference is output for performing one or more related actions. In one embodiment, the inference may be output to a user interface for display to the user or another user. For example, the inference may be output for display to notify the other user of the presence (or not) of the user within the residential space. As another example, the inference may be output for display to the user to receive a correction of the inference from the user (e.g. for use in optimizing the machine learning algorithm).

In another embodiment, the inference may be output to an application that provides alerts to the user or another user. For example, the actions may be performed based on the transitions in presence mentioned above, in which case the alerts may be provided based on the transitions. In yet another embodiment, the inference may be output to an application that provides Smart Home functions, such as optimizing use of the air conditioner/heater, lighting, home alarm system, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In general, a router mediates transmissions between the Internet Service Provider and the several residential devices. As part of its network management, this device handles and collects information such as connection details and activity, its performance and equipment information, together with the users' behavior derived from their connected devices' activity. The embodiments disclosed herein address the need of either the internet service provider (ISP) and the end user to know at certain accuracy if any of the household residents (tenants) is at home or expected to be home at any given time, one of many assessments that may be deduced from such data with the appropriate use of machine learning techniques.

The technical challenge is derived from the fact that there is no clear direct connection between device activity and its owner presence, and there are multiple estimations/correlations that needs to be done in order to derive user presence. Examples for it could be: smartphone that is our of battery, user of smart phone who is not at home but left some of its mobile devices home and connected, multi-user devices, multi-device users, new unassigned devices, etc. The embodiments disclosed herein learn in the background the activity patterns of the household, such that in the foreground it can actively classify all required assessments to estimate if a user and/or a device are within the residential space. The data used for this process is solely network traffic from the residential network router and indications transiting through the router device of the residential space or derivatives from this traffic. The learning process deduces the different devices' activity when the user is present in the residential space versus device behavior when the user is away from the residential space.

The machine learning techniques disclosed herein are enabled, in some embodiments, by new advances in the evolution of routers, where software agents are installed with the purpose of collecting data for analysis.

Although there are several solutions for identifying end users in a public network connection, such as in a shopping-mall, one uniqueness of the present embodiments is in identifying end users with respect to a residential network connection router. The residential network connection router differs in the behavior of its users, as it consists mainly of usage by stable equipment (user devices), some stationary and some not. The embodiments discloses herein include the classification of the different users identified by the router, regarding their affinity to the household, such as unidentified new equipment, which are to be classified as guests or intruders. There is also provided the ability to filter out neighbors and people transiting nearby.

Figure 2:
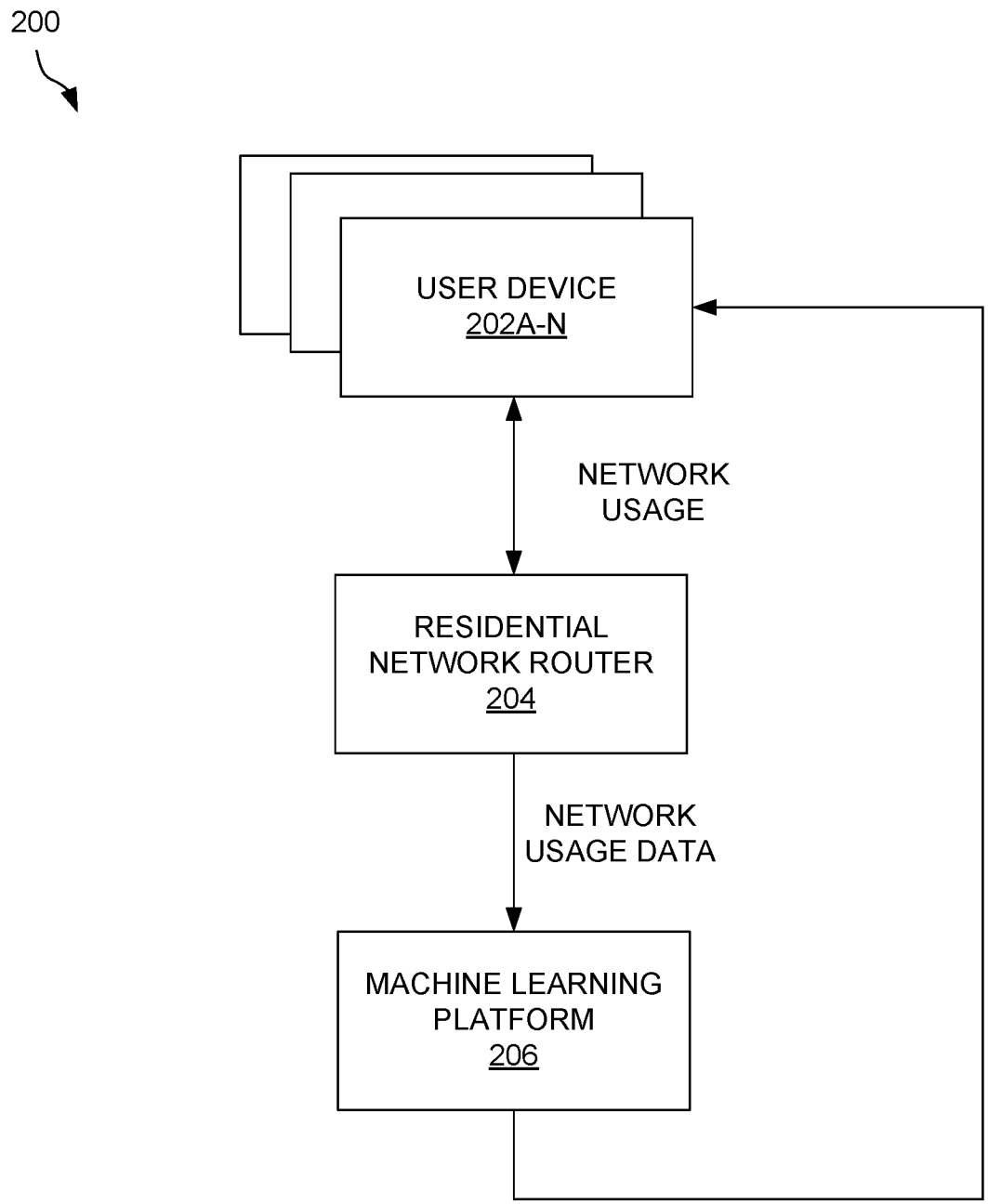
FIG. 2 illustrates a system for inferring user presence in a residential space, in accordance with one embodiment.

FIG. 2 illustrates a system 200 for inferring user presence in a residential space, in accordance with one embodiment. As an option, the machine learning system 200 may be implemented in the context of the details of the previous figure and/or any subsequent figure(s). Of course, however, the machine learning system 200 may be implemented in the context of any desired environment. Further, the aforementioned definitions may equally apply to the description below.

As shown, the system 200 includes at least one user device 202A-N that communicates with a residential network router 204. The user device 202A-N may be any type of end user device capable of connecting to a network via the residential network router 204. For example, the user device 202A-N may be a mobile phone, tablet, laptop computer, etc. In one embodiment, the user device 202A-N may communicate with the residential network router 204 via another network, such as a LAN.

Additionally, the system 200 includes a machine learning platform 206 in communication with the residential network router 204. The machine learning platform 206 may execute in the cloud, and thus remotely from the residential network router 204, in one embodiment. In this embodiment, the machine learning platform 206 may communicate with the residential network router 204 via the network to which the residential network router 204 provides the user device 202A-N with access. In another embodiment, the machine learning platform 206 may execute within the residential network router 204.

As shown, the user device 202A-N communicates with the residential network router 204 to access (use) the network. In turn, network usage data related to the network use by the user device 202A-N is collected from the residential network router 204 by the machine learning platform 206. The machine learning platform 206 processes the network usage data to infer whether a user is present in the residential space, which is then output for performing one or more related actions.

Figure 3:
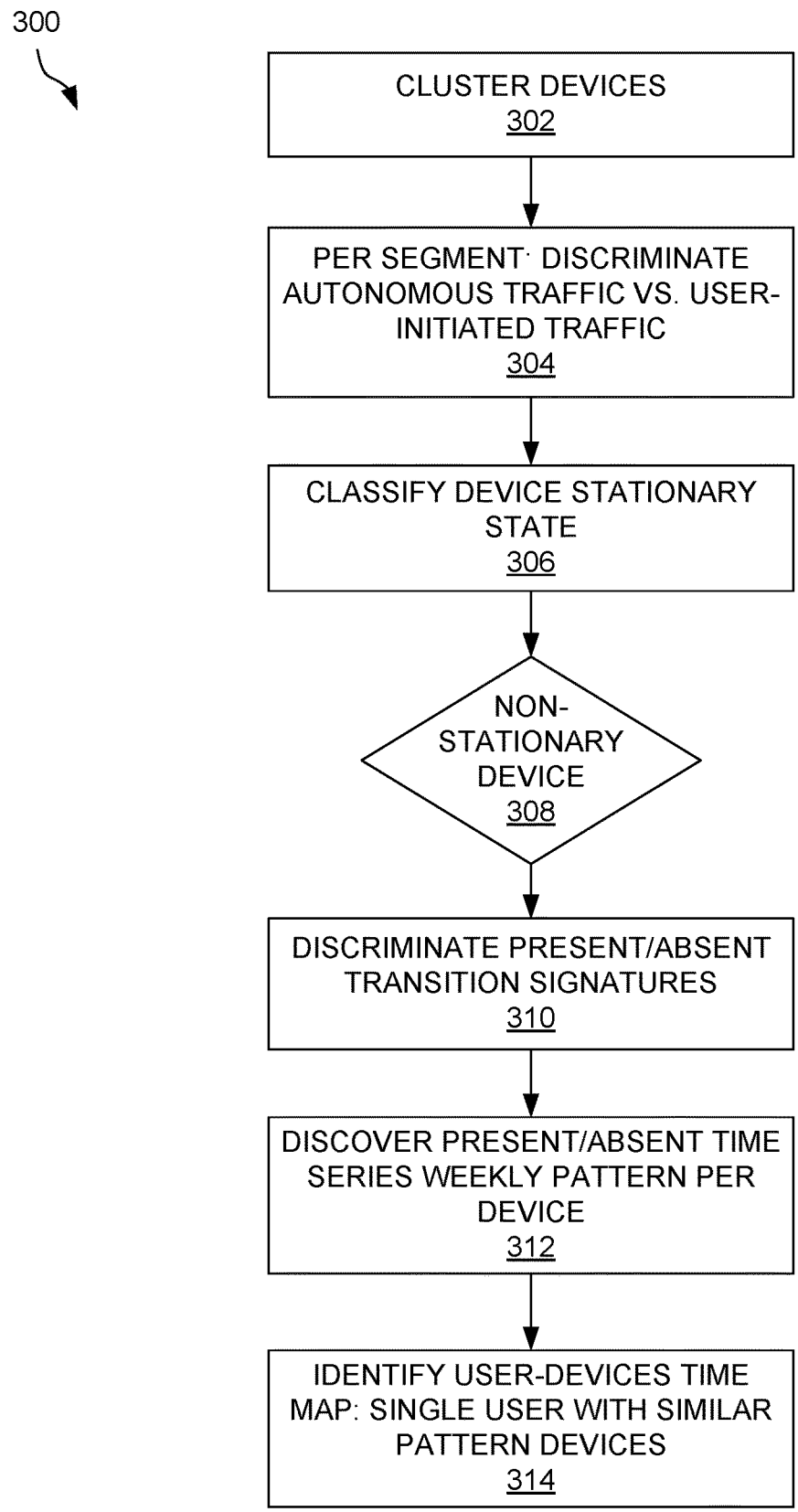
FIG. 3 illustrates a machine learning training process for the machine learning platform of FIG. 2, in accordance with one embodiment.

FIG. 3 illustrates a machine learning training process 300 for the machine learning platform 206 of FIG. 2, in accordance with one embodiment. The machine learning training process 300 may be performed as a background process of the system 200 of FIG. 2 for updating standard device traffic behavior patterns. Of course, however, the machine learning training process 300 may be carried out in the context of any desired environment. Further, the aforementioned definitions may equally apply to the description below.

In the present embodiment, the machine learning training process 300 has two main stages, data collection and pre-process, and model training. Data collection and preprocess includes the collection of information from different levels, such as the device with its definitions and its performance, as well as the network usage data such as traffic network events, time and frequency, loads up and down, throughput, packets, errors, and so forth. This collected information is organized such that the machine learning platform 206 can process it and output its deducted normality patterns of device behavior when a user is present at the residential space versus device behavior when the user is away from the residential space.

With regard to model training, the machine learning platform 206 performs several modeling (training) steps in order to infer presence of a user within the residential space. First, in operation 302, user devices are clustered. The user devices may be clustered (grouped) according to user device type (e.g. mobile phone, tablet, laptop, etc.).

Next, in operation 304, per user device segment (cluster), autonomous network traffic is differentiated from (discriminated against) user-initiated network traffic. For these purposes, labeled data should be analyzed. First clustering the devices may be required as the different user device types may imply different autonomous traffic patterns. This clustering implies applying unsupervised segmentation of devices, to assign a device class for further traffic autonomy classification.

Operation 304 is performed to recognize the time slots where the user is actively using the user device, hence, to conclude that the user and the device are at home (or within another residential space). Whereas, if the device is left at the home and only the user leaves the home, then only autonomous traffic should be observed for a long period.

Additionally, in operation 306, user devices are classified by stationary state. For every predefined time period, it is determined if a user device is stationary at home or wanders within the home with any of the household residents (and not visitors).

Further, in operation 308, non-stationary user devices are selected. Then, in operation 310, for the non-stationary user devices, present and absent transition signatures are differentiated (discovered). Home transition signatures as appearing in the processed network traffic should hint about one or more devices leaving the home boundaries for a significant time period. Such patterns are degrading quality until disconnection, active disconnection event, mapping the house topology to understand its boundaries, among possible others.

In operation 312, a present/absent time series weekly pattern is discovered per device. In other words, the normal presence weekly patterns per device are discovered. For example, an hour-slot weekly pattern may be built with the presence categorization, such that the device presence can be estimated and forecast. This pattern will support detecting the devices' groups wandering together, most probably with a single resident.

Still yet, in operation 314, a user-devices time map is identified, which is a single user with similar pattern devices. In one embodiment of operation 314, user devices are correlated to users/residents. In order to better estimate user presence, user devices that normally accompany the user in its wandering transition are correlated to that user. This information is supporting the presence estimation, where network events are inconclusive, such as a user device left home not purposely (e.g. battery is out or shut down, etc.) For example, if a user leaves the household with 2 of the 3 devices related to him, then it can be assumed that he left with higher probability than if only one device was left or no devices were left. In addition, new devices should be also used with care, until conclusive correlation can be achieved, and similarly for devices that leave the house but are not strictly correlated to one tenant. In another embodiment of operation 314, the resident normal presence weekly pattern is built in order to detect anomalies and alert upon them.

Table 1 shows the first-level output of the machine learning training process 300.

TABLE 1

Figure 4:
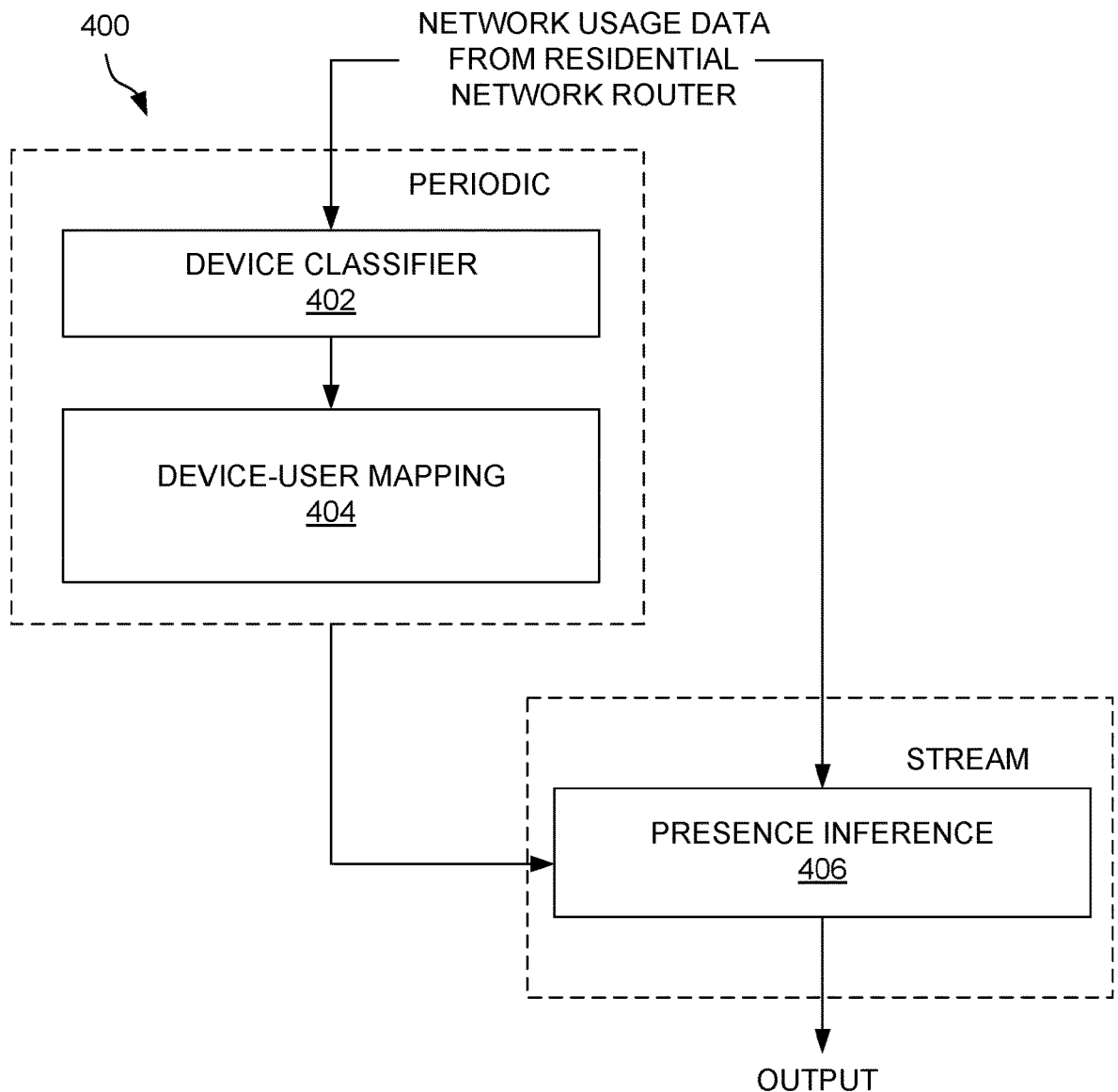
FIG. 4 illustrates a machine learning classification process for the machine learning platform of FIG. 2, in accordance with one embodiment.

Traffic classifier to autonomous vs. user-initiated
Device classifier to stationary and non-stationary TABLE 1-continued Presence weekly pattern per device
User-device weekly mapping
Presence weekly pattern per user
Feature vector for Foreground classifier FIG. 4 illustrates a machine learning classification process 400 for the machine learning platform 206 of FIG. 2, in accordance with one embodiment. The machine learning classification process 400 may be performed as a foreground process of the system 200 of FIG. 2 for inferring user presence within a residential space. Of course, however, the machine learning classification process 400 may be carried out in the context of any desired environment. Further, the aforementioned definitions may equally apply to the description below.

In the present embodiment, the machine learning classification process 400 includes three main stages: data collection and preprocess, periodical stationary classification of devices, and network events processing to infer presence transition.

With respect to data collection and preprocess, this step is like the one performed in the background, concentrating on the features that were detected as important by the learning process 300.

With respect to the periodical stationary classification of devices, this includes the device classifier 402 and the device-user mapping 404, as shown. Each device in a household should be periodically evaluated to conclude if it is stationary or not, as this is a dynamic state. In addition, new devices should be rapidly mapped and utilized for inference. Moreover, visitors should be detected, and their classification stored.

With respect to network events processing to infer presence transition, this includes the presence inference 406, as shown. On an event of connection, disconnection or gradual reception degradation below an acceptable threshold, of a device classified as a user device, the foreground stream analysis process of the machine learning algorithm infers if the device left the household boundaries, for a significant time period, together with the mapping to the correct residential user. This inference enables the end user to define smart alerts upon Presence-Absence transitions on specific user devices or specific resident/users. In addition, the end user or other applications can question the inference about presence of any user device or user, applying an acceptable privacy restrictions policy. These alerts can serve secondary applications contributing to Smart Home use cases.

A positive side effect of the inference process 400 is the ability to predict the standard presence pattern, easily boosted to provide anomaly detection for security services, detecting unwanted users or out-of-pattern behavior of residents, such as kids or elders.

In one embodiment, the inferred patterns may be presented to the end user in an app user interface (UI). In the UI, users may report errors in classification of equipment (user devices) to the types above. These human corrections are then taken as new labeled data, to improve the machine learning results for all users.

To this end, the machine learning classification process 400 may observe merely device traffic activity on the residential network router to recognize the user behind it, and recognize usage patterns that dictate transition in and out the household. The system described above decouples the device from the user, such that it discovers the user's traits behind the consumption observed, such that, for example, the system can deal with the fact that the device remained at home but the user left. Further, embodiments rely solely on residential network connection data collected by the router, including network activity going through the home gateway, but not using network activity going through the device network, nor customer data from the Service Provider. Thus, the embodiment may be managed at the router itself, elevating the residential network router to the proactive service of its owner, interacting with him and increasing his comfort and security within the residential space.

Figure 5:
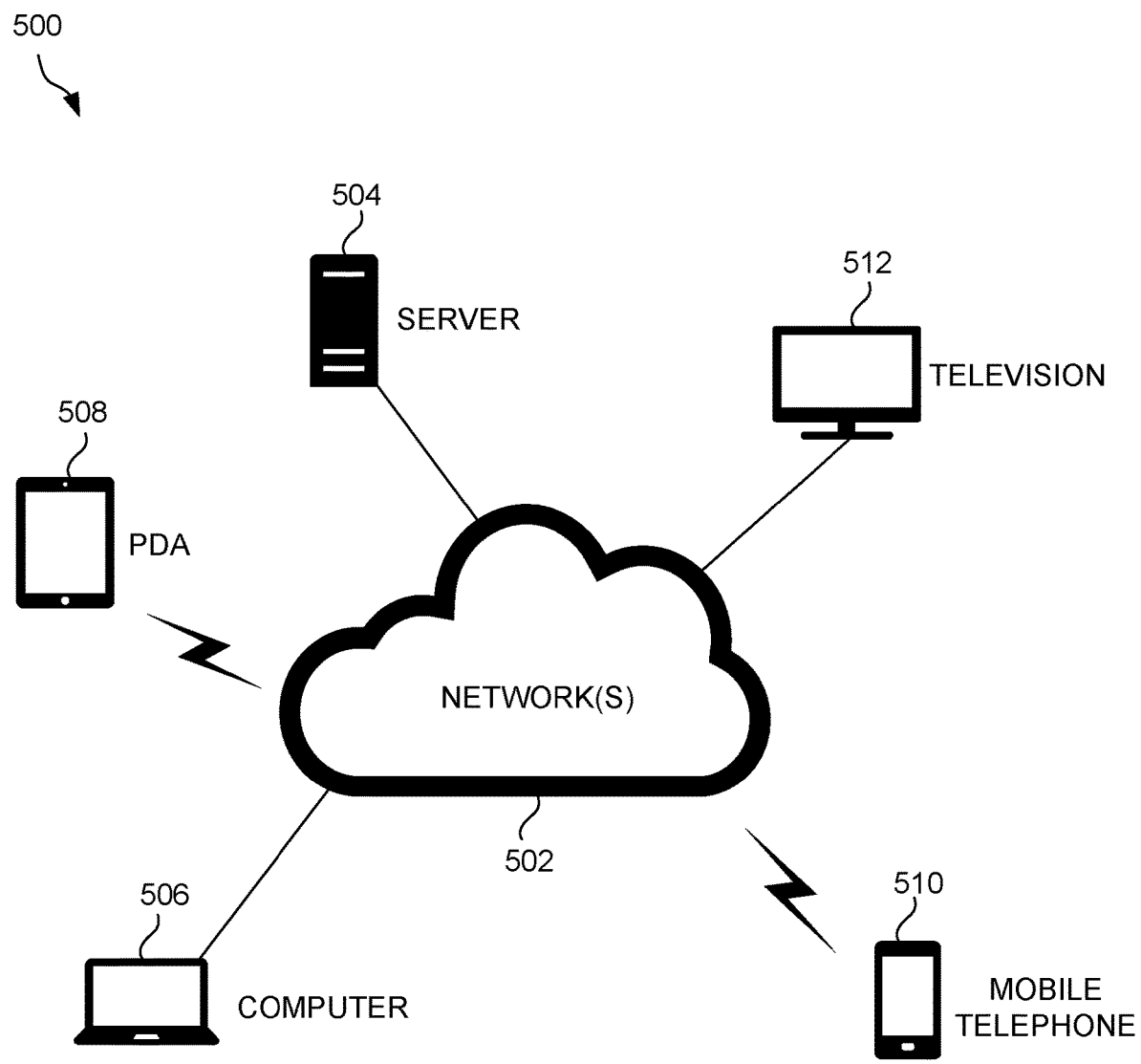
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
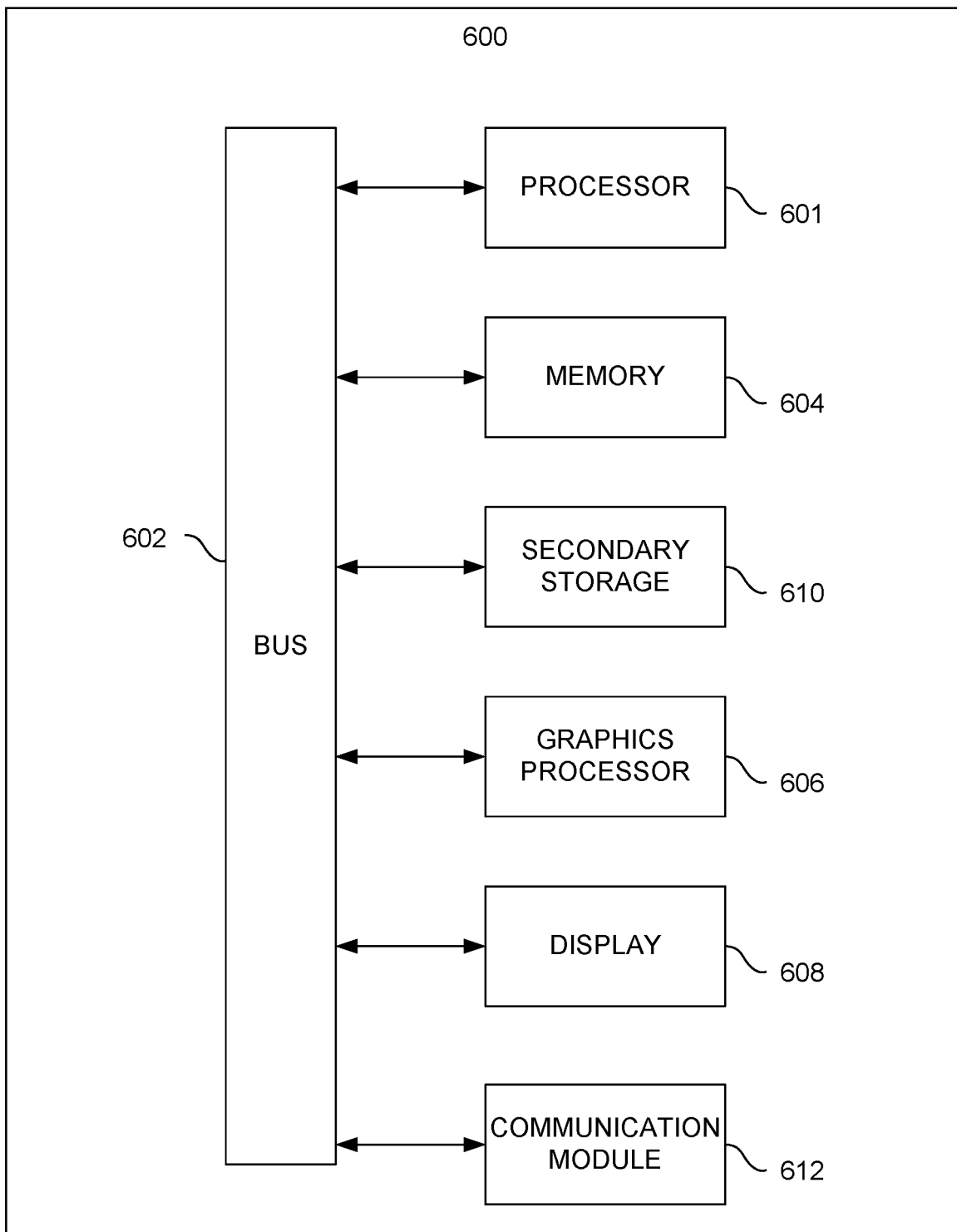
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   collecting network usage data from a residential network router, the residential network router operating in a residential space to enable communication between a network and a plurality of user devices within a communication range of the residential network router;
   processing, by a machine learning algorithm, the network usage data to infer whether a user is present in the residential space, wherein the machine learning algorithm is trained to infer whether the user is present in the residential space by:
     clustering user devices, and
     per user device cluster, discriminating between autonomous network traffic and user-initiated network traffic; and
   based upon a user-defined alert criteria for the user, outputting the inference to a user interface for display to the user or another user.

2. The non-transitory computer readable medium of claim 1, wherein the network usage data originates only at the residential network router and is data indicating instances of usage of a network by residents of the residential space.

3. The non-transitory computer readable medium of claim 2, wherein for each of the instances of usage, the network usage data includes at least one of a time of the instance of usage, a duration of the instance of usage, an amount of the instance of usage, a user device associated with the instance of usage, or a user account associated with the instance of usage.

4. The non-transitory computer readable medium of claim 1, wherein the residential network router is configured to communicate the network usage data in real-time such that the network usage data is collected in real-time.

5. The non-transitory computer readable medium of claim 1, wherein the machine learning algorithm infers from the network usage data whether the user is present in the residential space.

6. The non-transitory computer readable medium of claim 5, wherein one or more user devices connected to the residential network router are classified as stationary or non-stationary.

7. The non-transitory computer readable medium of claim 6, wherein the machine learning algorithm infers that the user is present in the residential space based at least in part on the classification of a device of the one or more user devices that is mapped to the user as non-stationary.

8. The non-transitory computer readable medium of claim 6, wherein the machine learning algorithm infers that the user is present in the residential space based at least in part on the classification of a device of the one or more user devices that is mapped to the user as stationary.

9. The non-transitory computer readable medium of claim 6, wherein the machine learning algorithm further performs network event processing to infer transitions in presence of the user within the residential space.

10. The non-transitory computer readable medium of claim 9, wherein the network event processing includes the processing of connections, disconnections, and gradual reception degradation below an acceptable threshold to infer the transitions.

11. The non-transitory computer readable medium of claim 9, wherein the machine learning algorithm is further trained to infer whether the user is present in the residential space by:
    classifying devices by stationary state, and
    discovering presence and absence transition signatures for non-stationary devices.

12. The non-transitory computer readable medium of claim 1, wherein the machine learning algorithm is further trained to infer whether the user is present in the residential space by:
    building device normal presence weekly patterns,
    correlating devices to residents of the residential space, and
    building resident normal presence weekly patterns.

13. The non-transitory computer readable medium of claim 1, wherein the user is a resident of the residential space.

14. The non-transitory computer readable medium of claim 1, wherein the collecting, processing, and outputting are performed by a cloud processing system in communication with the residential network router via a network.

15. The non-transitory computer readable medium of claim 1, wherein the residential network router includes the machine learning algorithm, and wherein the collecting, processing, and outputting are performed by the residential network router.

16. A method, comprising:
   collecting network usage data from a residential network router, the residential network router operating in a residential space to enable communication between a network and a plurality of user devices within a communication range of the residential network router;
   processing, by a machine learning algorithm, the network usage data to infer whether a user is present in the residential space, wherein the machine learning algorithm is trained to infer whether the user is present in the residential space by:
      clustering user devices, and
      per user device cluster, discriminating between autonomous network traffic and user-initiated network traffic; and
   based upon a user-defined alert criteria for the user, outputting the inference to a user interface for display to the user or another user.

17. A system, comprising:
   a non-transitory memory storing instructions; and
   one or more processors in communication with the non-transitory memory that execute the instructions to perform a method comprising:
   collecting network usage data from a residential network router, the residential network router operating in a residential space to enable communication between a network and a plurality of user devices within a communication range of the residential network router;
   processing, by a machine learning algorithm, the network usage data to infer whether a user is present in the residential space, wherein the machine learning algorithm is trained to infer whether the user is present in the residential space by:
      clustering user devices, and
      per user device cluster, discriminating between autonomous network traffic and user-initiated network traffic; and
   based upon a user-defined alert criteria for the user, outputting the inference to a user interface for display to the user or another user.

* * * * *